Nov. 25, 1958  B. T. BELL  2,861,378
FISH LINE DEFLECTOR
Filed June 24, 1955
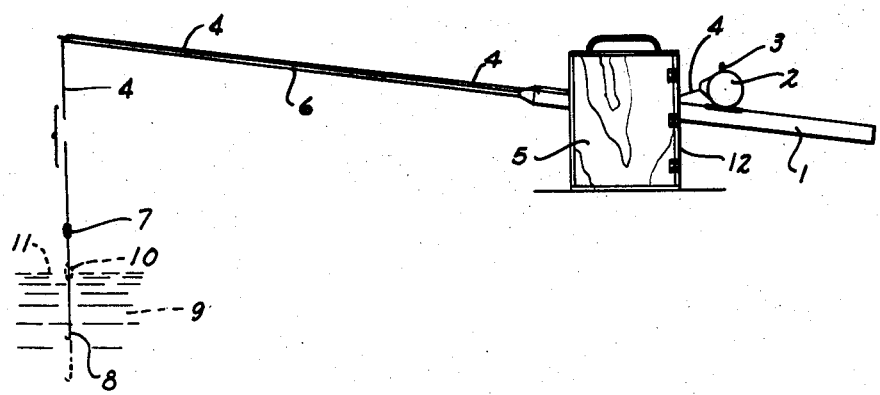
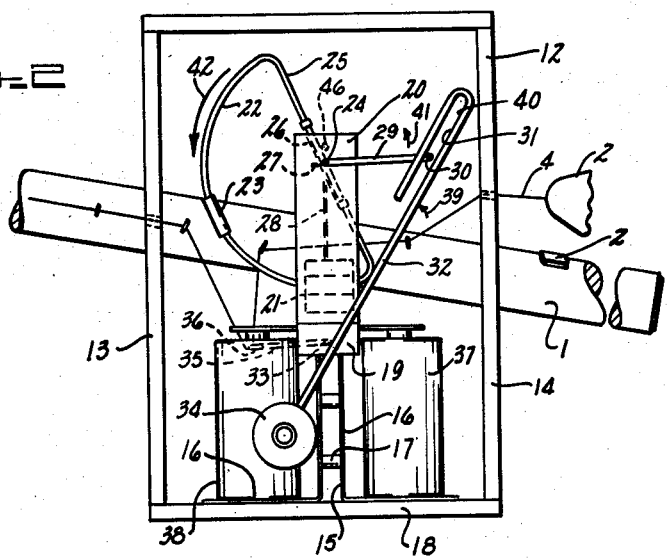
INVENTOR.
BASIL T. BELL
BY
SMITH, OLSEN & KOTTS
ATTORNEYS United States Patent Office 2,861,378
Patented Nov. 25, 1958

2,861,378

FISH LINE DEFLECTOR

Basil T. Bell, Inkster, Mich.

Application June 24, 1955, Serial No. 517,755

5 Claims. (Cl. 43—19.2)

This invention relates a fishing device in the nature of a fishline deflector.

In the art of still fishing, and particularly ice fishing, it is the usual practice to employ a fishing rod and reel, and to play-out a certain length of fishing line in accordance with the depth of the lake or other body of water being fished. It is desirable that the bait on the end of the line be capable of a certain motion or movement in the water in order to attract the surrounding fish and thereby enhance the possibilities for catching them. The most eye-catching movement which can be imparted to the bait is that which is obtained by moving or jerking the fishline vertically so as to cause the bait to take a violent up and down motion in the water. It is the usual practice in still fishing, and particularly ice fishing, to manually exert a series of discontinuous tugs or jerks on the fishing line so as to achieve the vertical jerking movement of the fishline. However, the fisherman usually remains at the fishing site for from upwards of one hour and it becomes quite tiresome to manually tug on the fishing line for such extended periods of time. There is a need therefore for a mechanism which will automatically effect this jerking action so as to make the fishing less tiresome and more enjoyable for the fisherman.

Normally the fisherman will employ a bobber on his line at the surface of the water, and when a fish strikes the bait the bobber will be pulled with the line below the surface of the water. The fisherman will then reel in his line so as to land the fish. Therefore, the line-jerking mechanism must be of such character that it will not interfere with reeling-in of the fishline. Preferably the line-jerking or deflecting mechanism should, in response to reeling-in motion of the line, automatically be de-energized so as to permit an unhindered reeling-in rotation of the fishing reel by the fisherman.

Besides the above-mentioned characteristics, the automatic fishline deflector should be a compact, lightweight, low cost item, and should incorporate a self-contained power source so as to permit its use in areas remote from external power sources.

The present invention provides a construction having the above-noted characteristics, and by way of summary various objects of the invention may be stated as follows:

One object of the invention is to provide a mechanism for automatically jerking or deflecting a fishline so as to move the bait in a vertical up and down direction and thereby attract the attention of surrounding fish.

Another object is to provide a line-deflecting mechanism of the above-identified characteristics and wherein said mechanism will, in response to reeling-in motion of a fishline, automatically be de-energized so as not to interfere with the reeling-in action.

Another object is to provide a fishline deflecting mechanism having the above-identified characteristics and capable of construction as a low cost, compact and lightweight item.

Other objects of this invention will appear in the following description and appended claims, reference being had to the accompanying drawings forming a part of this specification wherein like reference characters designate corresponding parts in the several views.

In the drawings:

Figure 1 is an elevational view of one embodiment of the invention showing it mounted on a conventional fishing rod;

Figure 2 is an enlarged view taken in the same direction as Figure 1, but with a closure panel removed from the illustrated construction for illustration purposes; and Figure 3 is a fragmentary partial sectional view taken in the same direction as Figure 2, but with certain parts of the illustrated mechanism removed for illustration purposes.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawing there is shown a conventional fishing rod 1 and a conventional fishing reel 2 having an operating crank 3. A fishing line 4 is wound on reel 2 and is threaded through a fishing line deflector 5 which constitutes the subject matter of the present invention. After the fishline leaves the mechanism 5 it is threaded through eyes 6 on the fishing rod and through a conventional bobber 7 to a fish hook 8.

Operation of mechanism 5 is such that after line 4 has been played-out to an extent that the hook 8 is at the required fish-catching depth in water 9 and bobber 7 takes the dotted line position 10 on water surface 11, mechanism 5 automatically and without any manual assistance from the fisherman exerts a jerking or deflecting action on line 4 such as to raise and lower bobber 7 and hook 8 from their dotted line positions to their full line positions and vice versa.

Mechanism 5 includes a housing 12 which is fastened on the handle of rod 1 in any convenient manner. In the illustrated embodiment the rod handle extends through openings 60 and 61 in the sidewalls 13 and 14 of the housing but connection of the housing on the rod handle could be effected by clamp means or other means not shown. Disposed within housing 12 is a support mechanism generally indicated by reference numeral 15, and in this connection housing 12 may be considered as a means for mounting the support mechanism 15 on fishing rod 1. Support mechanism 1 includes a pair of U-shaped brackets 16 interconnected by connector elements 17. Screws or the like (not shown) are employed for fixedly securing brackets 16 on the bottom wall 18 of housing 12. A third U-shaped bracket element 19 is mounted on brackets 16, and another bracket element 20 is mounted on bracket 19. Bracket 20 is similar to bracket 15 shown in United States Patent No. 2,598,954, granted to S. M. Wengel on June 3, 1952, and said bracket element 20 mounts a power mechanism similar to that disclosed in said Wengel patent. Said power mechanism includes a driving member in the form of a solenoid 21 and a driven member in the form of a curved rodlike arm 22 on which is mounted a permanent magnet 23 which constitutes an armature for solenoid 21. Arm 22 is connected to a pivot shaft 24 which extends through the parallel walls of bracket 20. There is secured on portion 25 of arm 22 a plate 26 and projecting from this plate is a contact element 27 of a similar construction to the contact element 29 shown in the Wengel patent. Cooperating with contact 27 is a flexible contact element 28 which is of a similar construction to that of contact element 30 in the Wengel patent. Pivot shaft 24 is formed with a right angularly turned arm portion 29 and a turned end portion 30 which rides in a slide portion 31 formed on one end of a first class lever 32. Lever 32 is fixedly and immovably secured on a pivot shaft 33 which is rotatably mounted in and extends through the end flanges of U-shaped bracket 19. The lower end of lever 32 has secured thereon a counterweight 34 for a purpose to be described later, and the rear end of shaft 33 is turned at right angles to provide an arm 35, the free end of which is reversely bent to form a fishline-engaging eye 36.

Solenoid 21 and magnet 23 form a power mechanism similar to that provided by solenoid 22 and magnet 25 of the Wengel patent. Operation of the power mechanism is such that when contact element 27 is engaged with contact element 28, solenoid 21 is energized by batteries 37 and 38. As with the solenoid 22 and magnet 25 in the Wengel patent the polarities of the present solenoid 21 and present magnet 23 are such that magnet 23 is forced out of solenoid 21 to the position shown in Figure 2. In the Figure 2 position counterweight 34 tends to rotate lever 32 in the direction of arrow 39 so as to cause surface 40 of slide 31 to push against turned end 30 and propel arm 29 in the direction of arrow 41. Arm 29 is integral with shaft portion 24 and shaft portion 24 is fixed relative to arm 22 so that motion of arm 29 in the direction of arrow 41 causes arm 22 to rotate or pivot in the direction of arrow 42. Rotation of arm 22 in the direction of arrow 42 causes contact element 27 to engage contact element 28 so as to energize solenoid 21 when the left end of magnet 23 is at or near the center of the solenoid. By the time energization of solenoid 21 is effective on magnet 23 its momentum has caused the left end of the magnet to be in a position where it will be attracted toward the right end of the solenoid, and hence energization of said solenoid is effective to move arm 22 further to the right in the same manner as arm 23 in the Wengel patent. Movement of arm 22 is effective to move arm 29 and lever 32 so as to rotate shaft 33 around its axis and thereby move arm 35 from its Figure 2 position (which coincides with the full line position in Figure 3), to the dotted line position 43 in Figure 3. During this movement of arm 35 the fishline 4 will be moved from its Figure 3 full line or "undeflected" position to its Figure 3 dotted line or "deflected" position. This movement of line 4 will result in an upward movement of bobber 7 and hook 8. While magnet 23 is within solenoid 21 and just before the magnet left end reaches the solenoid right end the contact between elements 27 and 28 is broken so as to deenergize the solenoid. However, the rightward momentum given to arm 22 by weight 34 causes magnet 23 to move to the right beyond the solenoid. During rightward movement of magnet 23 weight 34 is moving to the right about the axis of shaft 33. As weight 34 continues its rightward movement it counteracts the rightward momentum force which it has given to arm 22, and when this counteracting force overcomes the momentum force arm 22 stops and begins to swing down about the axis of shaft 24 in a leftward direction. The stopped position of arm 22 determines the dotted line position of arm 35. As arm 22 swings back to the left it carries magnet 23 back into the solenoid. When the right end of the magnet reaches the center of the solenoid contacts 27 and 28 become engaged, solenoid 21 becomes energized, and the right end of the magnet is attracted to the left end of the solenoid. Just before the magnet right end reaches the solenoid left end contact between elements 27 and 28 is broken to deenergize the solenoid. Thereafter momentum force from weight 34 causes arm 22 to be lifted to its Fig. 2 position. Movement of arm 35 from its Fig. 3 dotted line position to its full line position will result in a downward movement of bobber 7 and hook 8.

Generally reel 2 will be of such construction as to be equipped with a manually releasable catch or drag mechanism for preventing play-out of the fishline. Therefore reciprocating movement of arm 35 will result merely in a movement of portion 44 of line 4 and there will be no movement of portion 45 thereof. When a fish strikes the bait on hook 8 it is desirable that the line-deflecting mechanism be de-energized, i. e. that the reciprocation of arm 35 be discontinued, in order that the fisherman be enabled to unhinderingly reel in the fishline. With the illustrated mechanism there is no need to employ a manually actuated switch in order to de-energize the power means for the fishline deflector. The illustrated mechanism is of such design and construction that when crank 3 is rotated to reel in fishline 4, arm 35 automatically assumes its Figure 2 dotted line position with arm portion 25 in engagement with a stop member 46 which is fixedly secured in bracket 20. With arm portion 25 against stop 46 contact elements 27 and 28 are disengaged and solenoid 21 is de-energized. As a result the only force acting on arm 35 is that provided by counterweight 34. Counterweight 34 is of such weight and placement as not to materially interfere with the reeling-in action. Eye 36 on arm 35 "freely" engages line 4 so as not to interfere with the reeling in or reeling out action; i. e. line 4 is "free" to run through the eye at all times and there is no need to ever disengage the line from eye 36 during the fishing operation.

When it is desired to discontinue the fishing operation and halt the motion of arm 22, line 4 can be reeled into a taut position (or tied in a taut position) with arm 35 assuming its Figure 3 full line position and solenoid 21 unenergized. If desired de-energization of the solenoid may also be effected by merely removing either of batteries 37 or 38 from brackets 16.

Having thus described my invention, I claim:

1. A fishline deflector comprising a support mechanism, means for mounting said mechanism on a fishing rod having a fishline adapted to travel therealong when payed in and out, a line-engaging member mounted on said support mechanism for pivotal line-deflecting movement across the direction of fishline travel, power mechanism connected with said line-engaging member for effecting said movement, said power mechanism including a solenoid, a permanent magnet pivotally mounted on the support mechanism for reciprocal movement through said solenoid, contact means openable and closable in response to magnet movement for controlling current to the solenoid, said contact means being closed when the magnet is within the solenoid and opened when the magnet is out of the solenoid, an arm extending right angularly from the magnet pivot, a first class lever pivotally mounted on the support mechanism and having a slide portion on one of its ends slidably engaged with the free end of the arm and having a counterweight on its other end for returning the magnet into the solenoid when the contacts are open.

2. A fishline deflector comprising a support mechanism, means for mounting said mechanism on a fishing rod having a fishline adapted to travel therealong when payed in and out, a line-engaging member mounted on said support mechanism for pivotal line-deflecting movement across the direction of fishline travel, power mechanism connected with said line-engaging member for effecting said movement, said power mechanism including a solenoid, a permanent magnet pivotally mounted on the support mechanism for reciprocal movement through said solenoid, and contact means responsive to magnet movement for controlling current to the solenoid, said contact means being closed when the magnet is within the solenoid and opened when the magnet is out of the solenoid.

3. A fishline deflector comprising a support mechanism; means for mounting said mechanism on a fishing rod having a fishline adapted to travel therealong when payed in and out; a line-deflecting member pivotally mounted on said support mechanism for line-deflecting movement across the direction of fishline travel; said line-deflecting member freely engaging the fishline before said line leaves the fishing rod; electric power means connected with said line-deflecting member for moving said line-deflecting member about its pivot; two contacts openable and closable to control current flow to the electric-power means; one of said contacts being driven by the power means to its open position when the line is undeflected and being driven by the power means to its closed position against the other contact during movement of the line-engaging member toward its deflected position; whereby when the fishline is payed in, the line deflecting member automatically assumes its undeflected position with no opposition from the electric power means.

4. A fishline deflector comprising a support mechanism; means for mounting said mechanism on a fishing rod having a fishline adapted to travel therealong when payed in and out; a line-deflecting member pivotally mounted on said support mechanism for line-deflecting movement across the direction of fishline travel; said line-deflecting member freely engaging the fishline before said line leaves the fishing rod; electric power means connected with said line deflecting member for moving said line-deflecting member about its pivot between line-deflecting and undeflecting positions; and switch means responsive to movement of the line-deflecting member for de-energizing the power means when the line is in the undeflected position; whereby when the fishline is payed in, the line-deflecting member automatically assumes its undeflected position with no opposition from the electric power means.

5. A fishline deflector comprising a support mechanism; means for mounting said mechanism on a fishing rod having a fishline adapted to travel therealong when payed in and out; a line-deflecting member mounted for movement on said support mechanism across the direction of fishline travel; said line-deflecting member freely engaging the fishline before said line leaves the fishing rod; a solenoid carried by the support mechanism; an armature; means mounting said armature for reciprocable movement through said solenoid to give the armature motion; means connecting the armature and line-deflecting member for causing the line-deflecting member to be driven by the armature; and a counterweight operatively connected with the armature for returning said armature into the solenoid when the armature reaches the limit of its movement.

References Cited in the file of this patent

UNITED STATES PATENTS

| | | |
|---|---|---|
| 2,624,145 | Wehn | Jan. 6, 1953 |
| 2,643,478 | Paulsen | June 30, 1953 |
| 2,658,299 | Maxfield | Nov. 10, 1953 |
| 2,663,962 | King | Dec. 29, 1953 |
| 2,746,198 | Smith | May 22, 1956 |

FOREIGN PATENTS

| | | |
|---|---|---|
| 453,989 | Italy | Dec. 23, 1949 |

UNITED STATES PATENT OFFICE

CERTIFICATE OF CORRECTION

Patent No. 2,861,378

November 25, 1958

Basil T. Bell

It is hereby certified that error appears in the printed specification of the above numbered patent requiring correction and that the said Letters Patent should read as corrected below.

Column 1, line 15, after "relates" insert -- to --; column 4, line 71, or "responsive" read -- openable and closable in response --.

Signed and sealed this 17th day of March 1959.

(SEAL)

Attest:
KARL H. AXLINE
Attesting Officer

ROBERT C. WATSON
Commissioner of Patent